(12) United States Patent
Gardt et al.

(10) Patent No.: US 10,288,186 B2
(45) Date of Patent: May 14, 2019

(54) APPARATUS AND METHOD FOR DRIVING A SOLENOID VALVE

(71) Applicant: Robert Bosch GmbH, Stuttgart (DE)

(72) Inventors: Andrej Gardt, Abstatt (DE);
Christoph Eisele, Heilbronn (DE);
Valentin Schubitschew, Tamm (DE);
Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/841,411

(22) Filed: Dec. 14, 2017

(65) Prior Publication Data
US 2018/0172174 A1    Jun. 21, 2018

(30) Foreign Application Priority Data

Dec. 16, 2016 (DE) ........................ 10 2016 225 225

(51) Int. Cl.
| | |
|---|---|
| *F16K 31/06* | (2006.01) |
| *B60T 8/34* | (2006.01) |
| *B60T 8/36* | (2006.01) |
| *B60T 8/17* | (2006.01) |
| *B60T 8/171* | (2006.01) |
| *B60T 8/88* | (2006.01) |
| *H01F 7/18* | (2006.01) |

(52) U.S. Cl.
CPC ................ *F16K 31/06* (2013.01); *B60T 8/17* (2013.01); *B60T 8/171* (2013.01); *B60T 8/341* (2013.01); *B60T 8/363* (2013.01); *B60T 8/885* (2013.01); *H01F 7/18* (2013.01); *B60T 8/36* (2013.01); *B60T 2270/406* (2013.01)

(58) Field of Classification Search
CPC ........... F16K 31/06; B60T 8/341; B60T 8/363
USPC ...................... 251/129.04; 324/713
See application file for complete search history.

(56) References Cited

U.S. PATENT DOCUMENTS

| | | | | |
|---|---|---|---|---|
| 5,177,447 A | * | 1/1993 | Marino | G01R 31/007 324/378 |
| 6,127,830 A | * | 10/2000 | Engelmann | B60R 16/03 324/713 |
| 6,705,586 B2 | * | 3/2004 | Williges | F01P 7/167 251/129.04 |

(Continued)

FOREIGN PATENT DOCUMENTS

DE    195 29 433 A1    2/1997

*Primary Examiner* — John Bastianelli
(74) *Attorney, Agent, or Firm* — Maginot, Moore & Beck LLP (57) ABSTRACT

The disclosure relates to an apparatus and a method for driving a solenoid valve. The apparatus comprises a PWM apparatus, an evaluation and control unit, and a current measuring apparatus The evaluation and control unit is configured to: in a test operation, generate and emit test PWM signals having test duty ratios, the test PWM signals inducing test currents through a magnet assembly of the solenoid valve that are below a response threshold that triggers a switching process of the solenoid valve; derive presently prevailing ambient conditions of the test operation from the test PWM signals and the induced test currents; and in a normal operation generate and emit a PWM signal based on the presently prevailing ambient conditions of the test operation, the PWM signal inducing a current that is above the response threshold and switches the solenoid valve.

10 Claims, 1 Drawing Sheet

(56) References Cited

U.S. PATENT DOCUMENTS

| | | | | |
|---|---|---|---|---|
| 7,006,899 | B2 * | 2/2006 | Wakao | B60K 23/0808 |
| | | | | 700/286 |
| 8,505,872 | B2 * | 8/2013 | Kawamura | F16K 31/04 |
| | | | | 251/129.04 |
| 2005/0092949 | A1 * | 5/2005 | Wilhelm | F02D 35/0007 |
| | | | | 251/129.04 |
| 2015/0069277 | A1 * | 3/2015 | Brantweiner | H01F 7/064 |
| | | | | 251/129.04 |

* cited by examiner

APPARATUS AND METHOD FOR DRIVING A SOLENOID VALVE

This application claims priority under 35 U.S.C. § 119 to application no. DE 10 2016 225 225.9, filed on Dec. 16, 2016 in Germany, the disclosure of which is incorporated herein by reference in its entirety.

BACKGROUND

The disclosure proceeds from an apparatus or a method for driving a solenoid valve. The subject matter of the present disclosure is also a hydraulic assembly having such an apparatus for driving a solenoid valve.

The prior art discloses apparatuses and methods for driving solenoid valves used in hydraulic brake systems having ABS and/or ESP functionality. Solenoid valves of this kind are embodied, in particular, as normally closed or normally open high-pressure switching valves and comprise a magnet assembly having a magnet coil, the magnetic force of which is generated by means of the electric current through the magnet assembly or the magnet coil. As a technical component, a solenoid valve serves to monitor the inlet or outlet of fluids or to control and to regulate the flow direction. The electric currents for driving the solenoid valves can be regulated or controlled here. The currents are typically set by means of an output stage that can be regulated in terms of current, wherein a PWM apparatus (PWM: pulse-width modulation) performs the regulation of the current through the magnet assembly by means of a duty ratio of the emitted PWM signal. The current setting is very precise, since the current is measured back and the duty ratio of the emitted PWM signal and hence of the current flowing through the magnet assembly are corrected as appropriate. When controlling the current, a PWM signal having a fixed duty ratio is merely set, which is intended to result in the desired current. In this case, disturbance influences cannot be directly affected. During valve movement, the valve armatures of solenoid valves, in particular of switching valves, generate an inductive coupling on account of their physical design in connection with the magnet coil, said inductive coupling influencing the current through the magnet assembly or magnet coil during this phase. The quicker the valve armature moves, the greater the induction. This results, during regulated driving of the valve, in the change in current, which is caused by armature movement during switching, bringing about automatic adjustment of the regulating parameters of the current regulation. This means that the current regulation aims to counteract the interruption in current and, at this point, the duty ratio of the PWM signal and the current through the magnet assembly increases. Without current regulation, the interruption in current by the armature movement has its greatest value, that is to say the current through the magnet assembly has its lowest value, at the highest armature speed shortly before the valve armature impinges on the pole core. The current regulation compensates fully for this effect, with the result that the valve armature experiences an additional force precisely at the moment it impinges on the pole core and generates a much louder switching noise than without current regulation. However, the variance between the desired and the set current without current regulation can be relatively large, since present ambient conditions or disturbance influences, such as coil temperature, which has an influence on the electrical resistance of a coil winding, and voltage, for example, have a major influence on the result (current setting tolerance). The desired current that is above a response threshold of the magnet assembly for triggering the switching process of the solenoid valve can thus no longer be ensured in some circumstances.

DE 195 29 433 A1 discloses, for example, a method and a circuit arrangement for monitoring an output stage module to which a multiplicity of inductive loads are connected. In this case, the current flowing through the inductive loads is regulated by clocked driving of the output stages and the current caused by the inductively stored energy in the off phases of the output stages is partially or temporarily led through a common current measuring device and is evaluated, including the inductive loads, for the purpose of checking the output stages. The inductive loads are, for example, electrically actuable hydraulic valves, wherein the compliance with predefined current values is checked in separate measurement processes. The compliance of minimum values of the valve attraction current and/or the valve holding current can thus preferably be monitored. Furthermore, the output stages, including the hydraulic valves, can be tested by driving the respective output stage for a predefined time period below the valve response time or in which a valve current below the valve response value is produced, and by evaluating the switch-off currents or freewheeling currents.

SUMMARY

The apparatus for driving a solenoid valve having the features of the disclosure and the method for driving a solenoid valve each have the advantage that the current setting tolerances of the controlled current feed can be minimized by the test operation and improved NVH (noise vibration harshness) behavior can be achieved in comparison with current-regulated driving of the magnet assembly. In order to be able to set the currents precisely, test currents are set and measured at short intervals by means of predefined test PWM signals, the current magnitude of said test currents not being sufficient to switch the solenoid valves. The normal operation of the corresponding hydraulic assembly in which the solenoid valve is used is therefore not impaired. The direct relationship of the currently set duty ratio of the test PWM signal to the actual test current is given using the test currents. As a result, a high current setting accuracy can advantageously be implemented. The current through the magnet assembly can be set more precisely by way of embodiments of the present disclosure, since, with the test currents, there is a real-time relationship between the duty ratio of the PWM signal and the current. The corresponding valve switching noise is quiet, since the counter-current induced by the inductive coupling of the valve movement has a slowing effect on the valve armature.

Embodiments of the present disclosure provide an apparatus and a method for driving a solenoid valve. The apparatus for driving a solenoid valve comprises an evaluation and control unit, a PWM apparatus and a current measuring apparatus. In normal operation, the evaluation and control unit generates a PWM signal having a duty ratio and emits said PWM signal to a magnet assembly of the solenoid valve by means of the PWM apparatus. The current measuring apparatus detects an electric current through the magnet assembly resulting from the PWM signal and reports said current back to the evaluation and control circuit, wherein a current that is above a response threshold of the magnet assembly triggers a switching process of the solenoid valve. In test operation, the evaluation and control circuit generates and emits at least one test PWM signal having a duty ratio by means of the PWM apparatus, said at least one test PWM signal inducing a test current that is below the response threshold through the magnet assembly. Here, in test operation, the evaluation and control unit generates and emits at least two different test PWM signals and detects the resulting test currents. In addition, the evaluation and control unit derives presently prevailing ambient conditions from the predefined test PWM signals and the resulting test currents and, in normal operation, generates and emits a subsequent PWM signal based on the presently prevailing ambient conditions, said subsequent PWM signal inducing a current that is above the response threshold, for the purpose of switching the solenoid valve.

In addition, a hydraulic assembly having at least one solenoid valve and at least one such apparatus for driving a solenoid valve is proposed.

The method for driving a solenoid valve comprises the following steps: in normal operation, generating PWM signals and emitting said PWM signals to a magnet assembly of the solenoid valve. Detecting resulting currents through the magnet assembly, said currents being based on duty ratios of the PWM signals, and reporting said currents back, wherein a current that is above a response threshold of the magnet assembly triggers a switching process of the solenoid valve. In addition, in test operation, at least one test PWM signal is generated and emitted, said test PWM signal inducing a test current that is below the response threshold through the magnet assembly. Here, in test operation, at least two different test PWM signals are generated and emitted and the resulting test currents are detected. Presently prevailing ambient conditions are derived from the predefined test PWM signals and the resulting test currents. In a further step, in normal operation, a subsequent PWM signal, which is based on the presently prevailing ambient conditions and induces a current that is above the response threshold is generated and emitted for the purpose of switching the solenoid valve.

In the present case, the evaluation and control unit can be understood to mean an electrical device, such as a control device, for example, in particular a brake control device, which processes and evaluates detected sensor signals. The evaluation and control unit can have at least one interface that may be in hardware and/or software form. In the case of a hardware form, the interfaces may be part of what is known as a system ASIC, for example, which includes a wide variety of functions of the evaluation and control unit. However, it is also possible for the interfaces to be separate, integrated circuits or to consist, at least in part, of discrete components. In the case of a software form, the interfaces may be software modules that are present on a microcontroller in addition to other software modules, for example. Also advantageous is a computer program product having a program code that may be stored on a machine-readable carrier such as a semiconductor memory, a hard disk memory or an optical storage unit and is used for performing the evaluation when the program is executed by the evaluation and control unit.

In the present case, a PWM apparatus is understood to mean a module that generates a pulse-width-modulated (PWM) signal having a corresponding duty ratio in response to a drive signal and emits said PWM signal to the magnet assembly or to the magnet coil. As a result, the PWM signal has an average current flow whose value can be predefined by means of the duty ratio of the PWM signal.

Advantageous improvements of the apparatus for driving a solenoid valve specified in the disclosure and the method for driving a solenoid valve specified in the disclosure are possible by way of the measures and developments described in the embodiments.

It is particularly advantageous for the evaluation and control unit to be able to generate a first test PWM signal having a first duty ratio, said first test PWM signal inducing a first test current, and a second test PWM signal having a second duty ratio, said second PWM signal inducing a second test current, and to be able to emit said test PWM signals to the magnet assembly of the solenoid valve by means of the PWM apparatus. The current measuring apparatus can report the resulting test currents back to the evaluation and control unit. Advantageously, for the presently prevailing ambient conditions, the evaluation and control unit can determine a present functional relationship between the duty ratios and the resulting test currents from the predefined duty ratios of the test PWM signals and the resulting measured test currents and can extrapolate, in normal operation, a corresponding duty ratio of the PWM signal, which is to be applied, by means of the functional relationship and can generate and emit a corresponding PWM signal by means of the PWM apparatus. As a result, disturbance influences that influence the present ambient conditions can advantageously be compensated and a sufficiently high current that is above the response threshold of the magnet assembly can be provided.

In an advantageous configuration of the apparatus for driving a solenoid valve, the evaluation and control unit can generate and emit the different test PWM signals within a predefinable time window or in an event-oriented manner or at predefined times by means of the PWM apparatus.

In a further advantageous configuration of the apparatus for driving a solenoid valve, in normal operation, the evaluation and control unit can derive presently prevailing ambient conditions from the PWM signals and the resulting currents and, for a subsequent switching process, can generate and emit a subsequent PWM signal having a duty ratio based on the presently prevailing ambient conditions, said subsequent PWM signal being able to induce a current that is above the response threshold, for the purpose of switching the solenoid valve. As a result, an even better current setting accuracy can advantageously be achieved, even without current regulation.

BRIEF DESCRIPTION OF THE DRAWINGS

Exemplary embodiments of the disclosure are illustrated in the drawing and are explained in more detail in the following description. In the drawing, identical reference numerals denote component parts or elements that perform identical or analogous functions.

In the drawings.

DETAILED DESCRIPTION

Figure 1:
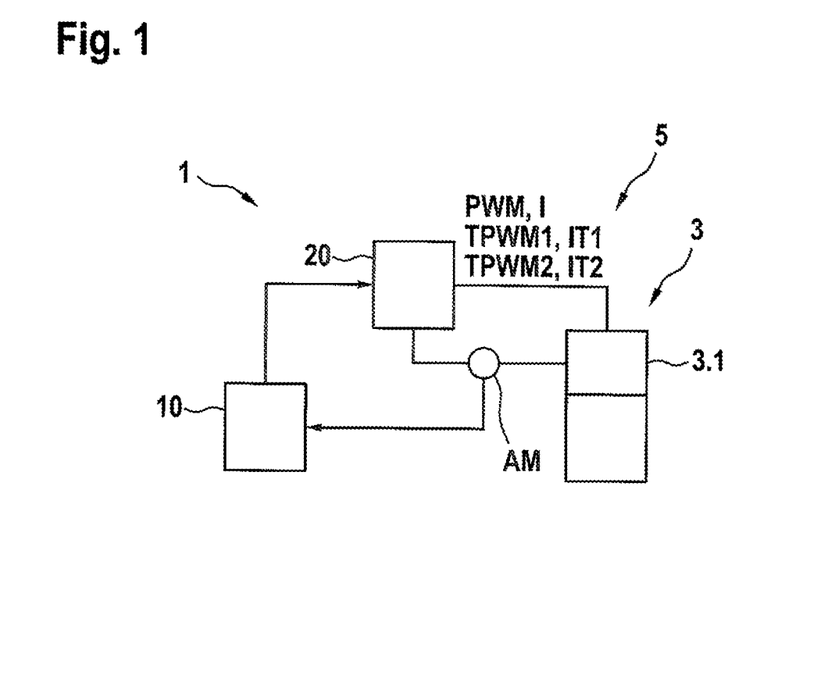
FIG. 1 shows a schematic block diagram of a section of an exemplary embodiment of a hydraulic assembly having an exemplary embodiment of an inventive apparatus for driving a solenoid valve.

As can be seen from FIG. 1, a hydraulic assembly 5 has at least one solenoid valve 3 and at least one apparatus 1 for driving a solenoid valve 3. In the exemplary embodiment illustrated, the apparatus 1 for driving a solenoid valve 3 comprises an evaluation and control unit 10, a PWM apparatus 20 and a current measuring apparatus AM. In normal operation, the evaluation and control unit 10 generates a PWM signal PWM having a duty ratio TV and emits said PWM signal to a magnet assembly 3.1 of the solenoid valve 3 by means of the PWM apparatus 20. The current measuring apparatus AM detects a current I through the magnet assembly 3.1 or through a magnet coil (not illustrated in any more detail) of the magnet assembly resulting from the PWM signal PWM and reports the value of the detected current I back to the evaluation and control circuit 10, wherein a current I that is above a response threshold of the magnet assembly 3.1 triggers a switching process of the solenoid valve 3. In addition, in test operation, the evaluation and control circuit 10 generates and emits at least one test PWM signal TPWM1, TPWM2 having a duty ratio TV1, TV2 by means of the PWM apparatus 20, said at least one test PWM signal inducing a test current IT1, IT2 that is below the response threshold through the magnet assembly 3.1. Here, in test operation, the evaluation and control unit 10 generates and emits at least two different test PWM signals TPWM1, TPWM2 and detects the resulting test currents IT1, IT2. The evaluation and control unit 10 derives presently prevailing ambient conditions from the predefined test PWM signals TPWM1, TPWM2 and the resulting test currents IT1, IT2. In normal operation, the evaluation and control unit 10 generates and emits a subsequent PWM signal PWM based on the presently prevailing ambient conditions, said subsequent PWM signal inducing a current I that is above the response threshold, for the purpose of switching the solenoid valve 3. Since the resulting current I is not regulated, a countercurrent generated by an inductive coupling of the valve armature movement induces deceleration of the valve armature when impinging on a corresponding pole core, which results in a quieter switching noise of the solenoid valve 1 than in the case of a regulated current I.

Figure 2:
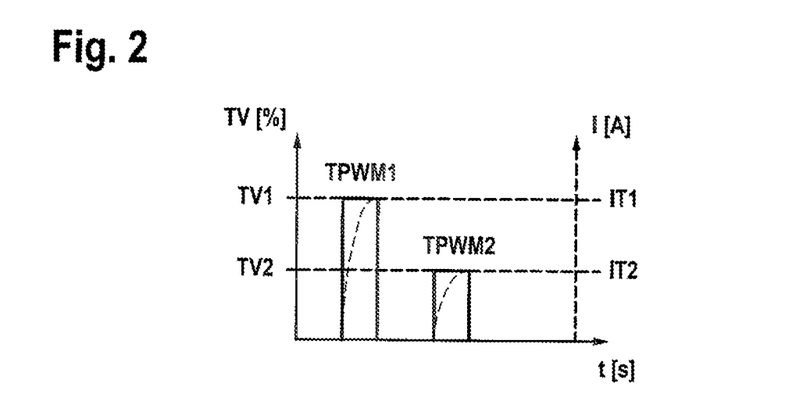
FIG. 2 shows a characteristic curve diagram, which illustrates two test PWM signals emitted by a PWM apparatus of the apparatus for driving a solenoid valve from FIG. 1 and two resulting test currents.

As can further be seen from FIGS. 1 and 2, in the exemplary embodiment illustrated, the evaluation and control unit 10 generates a first test PWM signal TPWM1 having a first duty ratio TV1, said first PWM signal inducing a first test current IT1, and a second test PWM signal TPWM2 having a second duty ratio TV2, said second test PWM signal inducing a second test current IT2, and emits said test PWM signals to the magnet assembly 3.1 of the solenoid valve 3 by means of the PWM apparatus 20. The current measuring apparatus AM reports the resulting test currents IT1, IT2 back to the evaluation and control unit 10.

For the presently prevailing ambient conditions, the evaluation and control unit 10 determines a present functional relationship F(TV1, TV2, IT1, IT2) between the duty ratios TV1, TV2 and the resulting test currents IT1, IT2 from the predefined duty ratios TV1, TV2 of the test PWM signals TPWM1, TPWM2 and the resulting measured test currents IT1, IT2. The evaluation and control unit 10 extrapolates, in normal operation, a corresponding duty ratio TV of the PWM signal PWM, which is to be applied, by means of the functional relationship. The evaluation and control unit 10 generates and emits a corresponding PWM signal PWM by means of the PWM apparatus 20. The evaluation and control unit 10 can generate and emit the different test PWM signals TPWM1, TPWM2, for example, within a predefinable time window or in an event-oriented manner or at predefined times by means of the PWM apparatus 20.

In the exemplary embodiment illustrated, in normal operation, the evaluation and control unit 10 derives presently prevailing ambient conditions from the PWM signals PWM and the resulting currents I and, for a subsequent switching process, generates and emits a subsequent PWM signal PWM having a duty ratio TV based on the presently prevailing ambient conditions by means of the PWM apparatus 20, said subsequent PWM signal inducing a current I that is above the response threshold, for the purpose of switching the solenoid valve 3. As a result, it is possible to compensate for disturbance influences promptly, even without current regulation.

A corresponding method for driving a solenoid valve 3 comprises the following steps: in normal operation, generating PWM signals PWM and emitting said PWM signals to a magnet assembly 3.1 of the solenoid valve 3. Detecting resulting currents I through the magnet assembly 3.1, said currents being based on duty ratios TV of the PWM signals PWM, and reporting said currents back, wherein a current I that is above a response threshold of the magnet assembly 3.1 triggers a switching process of the solenoid valve 3. In test operation, at least one test PWM signal TPWM1, TPWM2 is generated and emitted, said test PWM signal inducing a test current IT1, IT2 that is below the response threshold through the magnet assembly 3.1. Here, in test operation, at least two different test PWM signals TPWM1, TPWM2 are generated and emitted and the resulting test currents IT1, IT2 are detected. Deriving presently prevailing ambient conditions from the predefined test PWM signals TPWM1, TPWM2 and the resulting test currents IT1, IT2. In normal operation, generating and emitting a subsequent PWM signal PWM, which is based on the presently prevailing ambient conditions and induces a current I that is above the response threshold, for the purpose of switching the solenoid valve 3.

As can be further seen from FIG. 2, a first test PWM signal TPWM1 having a first duty ratio TV1, said first test PWM signal inducing a first test current IT1, and a second test PWM signal TPWM2 having a second duty ratio TV2, said second test PWM signal inducing a second test current IT2, are generated and emitted to the magnet assembly 3.1 of the solenoid valve 3 and the resulting test currents IT1, IT2 are detected. The different test PWM signals TPWM1, TPWM2 are generated and emitted within a predefinable time window or in an event-oriented manner or at predefined times. For the presently prevailing ambient conditions, a present functional relationship between the duty ratios TV1, TV2 and the resulting test currents IT1, IT2 from the predefined duty ratios TV1, TV2 of the test PWM signals TPWM1, TPWM2 and the resulting detected test currents IT1, IT2 is determined. In normal operation, a corresponding duty ratio TV of the PWM signal PWM, which is to be applied, is extrapolated by means of the functional relationship and a corresponding subsequent PWM signal PWM is generated and emitted.

In this way, it is possible to more or less effectively compensate for the influence of temperature depending on the number or time interval of the test PWM signals TPWM1, TPWM2. The changing relationship between the duty ratios TV1, TV2 of the test PWM signals TPWM1, TPWM2 and the resulting test currents IT1, IT2 can be determined dynamically using the test PWM signals TPWM1, TPWM2, with the result that, in normal operation, the solenoid valve 1 can be operated as quietly as possible.

Furthermore, in normal operation, presently prevailing ambient conditions are derived from the PWM signals PWM and the resulting currents I and, for a subsequent switching process, a subsequent PWM signal PWM having a duty ratio TV is generated and emitted based on the presently prevailing ambient conditions, said subsequent PWM signal inducing a current I that is above the response threshold, for the purpose of switching the solenoid valve 3.

Embodiments of the present disclosure can be used in high-pressure switching valves in vehicle brake systems (ABS, ESP, etc.). The inventive principle of driving based on test PWM signals can be applied in pneumatic and hydraulic solenoid valves.

What is claimed is:

1. A method for driving a solenoid valve (3), having the following steps:
   in normal operation, generating PWM signals (PWM) and emitting said PWM signals to a magnet assembly (3.1) of the solenoid valve (3),
   detecting resulting currents (I) through the magnet assembly (3.1), said currents being based on duty ratios (TV) of the PWM signals (PWM), and reporting said currents back,
   wherein a current (I) that is above a response threshold of the magnet assembly (3.1) triggers a switching process of the solenoid valve (3),
   wherein, in test operation, at least one test PWM signal (TPWM1, TPWM2) is generated and emitted, said test PWM signal inducing a test current (IT1, IT2) that is below the response threshold through the magnet assembly (3.1), distinguished by the following steps:
   in test operation, generating and emitting at least two different test PWM signals (TPWM1, TPWM2),
   detecting the resulting test currents (IT1, IT2),
   deriving presently prevailing ambient conditions from the predefined test PWM signals (TPWM1, TPWM2) and the resulting test currents (IT1, IT2),
   in normal operation, generating and emitting a subsequent PWM signal (PWM), which is based on the presently prevailing ambient conditions and induces a current (I) that is above the response threshold, for the purpose of switching the solenoid valve (3).

2. The method as claimed in claim 1, wherein a first test PWM signal (TPWM1) having a first duty ratio (TV1), said first test PWM signal inducing a first test current (IT1), and a second test PWM signal (TPWM2) having a second duty ratio (TV2), said second test PWM signal inducing a second test current (IT2), are generated and emitted to the magnet assembly (3.1) of the solenoid valve (3) and resulting test currents (IT1, IT2) are detected, wherein the different test PWM signals (TPWM1, TPWM2) are generated and emitted within a predefinable time window or in an event-oriented manner or at predefined times.

3. The method as claimed in claim 2, wherein, for the presently prevailing ambient conditions, a present functional relationship between the duty ratios (TV1, TV2) and the resulting test currents (IT1, IT2) from the predefined duty ratios (TV1, TV2) of the test PWM signals (TPWM1, TPWM2) and the resulting detected test currents (IT1, IT2) is determined and, in normal operation, a corresponding duty ratio (TV) of the subsequent PWM signal (PWM), which is to be applied, is extrapolated by means of the functional relationship and a corresponding subsequent PWM signal (PWM) is generated and emitted.

4. The method as claimed in one of claims 1 to 3, wherein, in normal operation, presently prevailing ambient conditions are derived from the PWM signals (PWM) and the resulting currents (I) and, for a subsequent switching process, a subsequent PWM signal (PWM) having a duty ratio (TV) is generated and emitted based on the presently prevailing ambient conditions, said subsequent PWM signal inducing a current (I) that is above the response threshold, for the purpose of switching the solenoid valve (3).

5. An apparatus (1) for driving a solenoid valve (3), having an evaluation and control unit (10), a PWM apparatus (20) and a current measuring apparatus (AM), wherein, in normal operation, the evaluation and control unit (10) generates a PWM signal (PWM) having a duty ratio (TV) and emits said PWM signal to a magnet assembly (3.1) of the solenoid valve (3) by means of the PWM apparatus (20), wherein the current measuring apparatus (AM) detects a current (I) through the magnet assembly (3.1) resulting from the PWM signal (PWM) and reports said current back to the evaluation and control circuit (10), wherein a current (I) that is above a response threshold of the magnet assembly (3.1) triggers a switching process of the solenoid valve (3), and wherein, in test operation, the evaluation and control circuit (10) generates and emits at least one test PWM signal (TPWM1, TPWM2) having a duty ratio (TV1, TV2) by means of the PWM apparatus (20), said at least one test PWM signal inducing a test current (IT1, IT2) that is below the response threshold through the magnet assembly (3.1), wherein, in test operation, the evaluation and control unit (10) generates and emits at least two different test PWM signals (TPWM1, TPWM2) and detects the resulting test currents (IT1, IT2), wherein the evaluation and control unit (10) derives presently prevailing ambient conditions from the predefined test PWM signals (TPWM1, TPWM2) and the resulting test currents (IT1, IT2) and, in normal operation, generates and emits a subsequent PWM signal (PWM) based on the presently prevailing ambient conditions, said subsequent PWM signal inducing a current (I) that is above the response threshold, for the purpose of switching the solenoid valve (3).

6. The apparatus (1) as claimed in claim 5, wherein the evaluation and control unit (10) generates a first test PWM signal (TPWM1) having a first duty ratio (TV1), said first test PWM signal inducing a first test current (IT1), and a second test PWM signal (TPWM2) having a second duty ratio (TV2), said second test PWM signal inducing a second test current (IT2), and emits said test PWM signals to the magnet assembly (3.1) of the solenoid valve (3) by means of the PWM apparatus (20), wherein the current measuring apparatus (AM) reports the resulting test currents (IT1, IT2) back to the evaluation and control unit (10).

7. The apparatus (1) as claimed in claim 6, wherein, for the presently prevailing ambient conditions, the evaluation and control unit (10) determines a present functional relationship between the duty ratios (TV1, TV2) and the resulting test currents (IT1, IT2) from the predefined duty ratios (TV1, TV2) of the test PWM signals (TPWM1, TPWM2) and the resulting measured test currents (IT1, IT2) and extrapolates, in normal operation, a corresponding duty ratio (TV) of the PWM signal (PWM), which is to be applied, by means of the functional relationship and generates and emits a corresponding PWM signal (PWM) by means of the PWM apparatus (20).

8. The apparatus (1) as claimed in one of claims 5 to 7, wherein the evaluation and control unit (10) generates and emits the different test PWM signals (TPWM1, TPWM2) within a predefinable time window or in an event-oriented manner or at predefined times by means of the PWM apparatus (20).

9. The apparatus (1) as claimed in one of claims 5 to 8, wherein, in normal operation, the evaluation and control unit (10) derives presently prevailing ambient conditions from the PWM signals (PWM) and the resulting currents (I) and, for a subsequent switching process, generates and emits a subsequent PWM signal (PWM) having a duty ratio (TV) based on the presently prevailing ambient conditions, said subsequent PWM signal inducing a current (I) that is above the response threshold, for the purpose of switching the solenoid valve (3).

10. A hydraulic assembly (5) having at least one solenoid valve (3) and at least one apparatus (1) for driving a solenoid valve (3), wherein the apparatus (1) for driving a solenoid valve (3) is embodied as claimed in one of claims 5 to 9.

* * * * *

UNITED STATES PATENT AND TRADEMARK OFFICE
CERTIFICATE OF CORRECTION

PATENT NO. : 10,288,186 B2
APPLICATION NO. : 15/841411
DATED : May 14, 2019
INVENTOR(S) : Gardt et al.

Page 1 of 4

It is certified that error appears in the above-identified patent and that said Letters Patent is hereby corrected as shown below:

In the Claims

Replace Column 7, Line 9 through Column 9, Line 7, with the following Claims:

1. A method for driving a solenoid valve, the method comprising:
    generating, in normal operation, PWM signals having duty ratios and emit the PWM signals to a magnet assembly of the solenoid valve;
    detecting currents through the magnet assembly resulting from the PWM signals and reporting the currents to the evaluation and control circuit, a switching process of the solenoid valve being triggered in response to the first current being above a response threshold of the magnet assembly;
    generating and emitting, in a test operation, at least two different test PWM signals having test duty ratios, the at least two different test PWM signals inducing test currents through the magnet assembly that are below the response threshold through the magnet assembly;
    deriving presently prevailing ambient conditions of the test operation from the at least two different test PWM signals and the induced test currents; and
    generating and emitting, in the normal operation, a first PWM signal of the PWM signals based on the presently prevailing ambient conditions of the test operation, the first PWM signal inducing a first current that is above the response threshold and switches the solenoid valve.

2. The method as claimed in claim 1, further comprising:
    generating a first test PWM signal of the at least two different test PWM signals having a first test duty ratio, the first test PWM signal inducing a first test current through the magnet assembly;
    generating a second test PWM signal the at least two different test PWM signals having a second test duty ratio, the second test PWM signal inducing a second test current through the magnet assembly;
    emitting the first test PWM signal and the second test PWM signal to the magnet assembly of the solenoid valve;
    detecting the first test current and the second test current; and
    generating and emitting the at least two different test PWM signals at least one of (i) within a predefinable time window, (ii) in an event-oriented manner, and (iii) at predefined Signed and Sealed this
Third Day of September, 2019

Andrei Iancu
*Director of the United States Patent and Trademark Office* times.

3. The method as claimed in claim 2, further comprising:
   determining a present functional relationship between the first and second test duty ratios and the first and second test currents;
   extrapolating a first duty ratio of the first PWM signal, which is to be applied in the normal operation, using the determined functional relationship; and
   generating and emitting the first PWM signal having the first duty ratio.

4. The method as claimed in claim 1, further comprising:
   deriving, in the normal operation, presently prevailing ambient conditions of the normal operation from the first PWM signal and the resulting first current; and
   generating and emitting, for a subsequent switching process, a second PWM signal of the PWM signals having a second duty ratio based on the presently prevailing ambient conditions of the normal operation, the second PWM signal inducing a second current that is above the response threshold and switches the solenoid valve.

5. An apparatus for driving a solenoid valve, the apparatus comprising
   a pulse-width-modulation (PWM) apparatus;
   an evaluation and control unit configured to, in a normal operation, using the PWM apparatus, generate PWM signals having duty ratios and emit the PWM signals to a magnet assembly of the solenoid valve; and
   a current measuring apparatus configured to detect currents through the magnet assembly resulting from the PWM signals and report the currents to the evaluation and control circuit, a switching process of the solenoid valve being triggered in response to the currents being above a response threshold of the magnet assembly,
   wherein the evaluation and control unit is further configured to:
      in a test operation, using the PWM apparatus, generate and emit at least two different test PWM signals having test duty ratios, the at least two different test PWM signals inducing test currents through the magnet assembly that are below the response threshold through the magnet assembly;
      derive presently prevailing ambient conditions of the test operation from the at least two different test PWM signals and the induced test currents; and
      in the normal operation, using the PWM apparatus, generate and emit a first PWM signal of the PWM signals based on the presently prevailing ambient conditions of the test operation, the first PWM signal inducing a first current that is above the response threshold and switches the solenoid valve.

6. The apparatus as claimed in claim 5, the evaluation and control unit further configured to:
   generate a first test PWM signal of the at least two different test PWM signals having a first test duty ratio, the first test PWM signal inducing a first test current through the magnet assembly;
   generate a second test PWM signal the at least two different test PWM signals having a second test duty ratio, the second test PWM signal inducing a second test current through the magnet assembly; and
   emit the first test PWM signal and the second test PWM signal to the magnet assembly of the solenoid valve using the PWM apparatus, wherein the current measuring apparatus is configured to report the first test current and the second test current to the evaluation and control unit.

7. The apparatus as claimed in claim 6, the evaluation and control unit further configured to:
   determine a present functional relationship between the first and second test duty ratios and the first and second test currents;
   extrapolate a first duty ratio of the first PWM signal, which is to be applied in the normal operation, using the determined functional relationship; and
   generates and emit, using the PWM apparatus, the first PWM signal having the first duty ratio.

8. The apparatus as claimed in claim 5, the evaluation and control unit further configured to:
   generate and emit, using the PWM apparatus, the at least two different test PWM signals at least one of (i) within a predefinable time window, (ii) in an event-oriented manner, and (iii) at predefined times.

9. The apparatus as claimed in claim 5, the evaluation and control unit further configured to:
   in the normal operation, derive presently prevailing ambient conditions of the normal operation from the first PWM signal and the resulting first current; and
   for a subsequent switching process, generate and emit a second PWM signal of the PWM signals having a second duty ratio based on the presently prevailing ambient conditions of the normal operation, the second PWM signal inducing a second current that is above the response threshold and switches the solenoid valve.

10. A hydraulic assembly comprising:
    at least one solenoid valve having a magnet assembly, a switching process of the at least one solenoid valve being triggered in response to currents through the magnet assembly being above a response threshold of the magnet assembly; and
    at least one apparatus for driving the at least one solenoid valve, the at least one apparatus comprising:
    a pulse-width-modulation (PWM) apparatus;
    an evaluation and control unit configured to, in a normal operation, using the PWM apparatus, generate PWM signals having duty ratios and emit the PWM signals to a magnet assembly of the at least one solenoid valve; and
    a current measuring apparatus configured to detect currents through the magnet assembly resulting from the PWM signals and report the currents to the evaluation and control circuit,
    wherein the evaluation and control unit is further configured to:
        in a test operation, using the PWM apparatus, generate and emit at least two different test PWM signals having test duty ratios, the at least two different test PWM signals inducing test currents through the magnet assembly that are below the response threshold through the magnet assembly;
        derive presently prevailing ambient conditions of the test operation from the at least two different test PWM signals and the induced test currents; and
        in the normal operation, using the PWM apparatus, generate and emit a first PWM signal of the PWM signals based on the presently prevailing ambient conditions of the test operation, the first PWM signal inducing a first current that is above the response threshold and switches the at least one solenoid valve.